United States Patent
Kim et al.

(10) Patent No.: US 11,592,860 B2
(45) Date of Patent: Feb. 28, 2023

(54) CLOCK GENERATOR FOR REDUCING POWER AND SYSTEM ON CHIP INCLUDING THE SAME

(71) Applicant: Samsung Electronics Co., Ltd., Suwon-si (KR)

(72) Inventors: Dohyung Kim, Seoul (KR); Minyoung Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/470,535

(22) Filed: Sep. 9, 2021

(65) Prior Publication Data
US 2022/0147096 A1    May 12, 2022

(30) Foreign Application Priority Data
Nov. 10, 2020    (KR) ........................ 10-2020-0149599

(51) Int. Cl.
*G06F 1/10*    (2006.01)
*G06F 1/08*    (2006.01)
*G06F 15/78*    (2006.01)

(52) U.S. Cl.
CPC .................. *G06F 1/08* (2013.01); *G06F 1/10* (2013.01); *G06F 15/7807* (2013.01)

(58) Field of Classification Search
CPC ..................................... G06F 1/10; G06F 1/12
See application file for complete search history.

(56) References Cited

U.S. PATENT DOCUMENTS

| | | | |
|---|---|---|---|
| 6,922,111 B2 | 7/2005 | Kurd et al. | |
| 8,629,703 B2 * | 1/2014 | Shibayama | H03K 23/662 327/295 |
| 9,541,992 B2 | 1/2017 | Lee et al. | |
| 9,915,968 B2 | 3/2018 | Jain et al. | |
| 10,009,016 B1 | 6/2018 | Ho et al. | |
| 10,020,931 B2 | 7/2018 | Abdelmoneum et al. | |
| 10,587,250 B2 | 3/2020 | Hanke et al. | |
| 2005/0022042 A1 * | 1/2005 | Tam | G06F 1/305 713/323 |
| 2012/0187991 A1 | 7/2012 | Sathe et al. | |

(Continued)

FOREIGN PATENT DOCUMENTS

KR    101462756 B1    11/2014

OTHER PUBLICATIONS

Floyd, Michael S., et al., "Adaptive Clocking in the POWER9TM Processor for Voltage Droop Protection", ISSCC 2017 / Session 26 / Processor-Power Management and Clocking / 26.5, pp. 444-445.

(Continued)

*Primary Examiner* — Phil K Nguyen
(74) *Attorney, Agent, or Firm* — Myers Bigel, P.A.

(57) ABSTRACT

A system on chip includes: a functional circuit configured to perform a processing operation by receiving a supply voltage; a droop detection circuit configured to monitor the supply voltage and generate a detection signal indicating whether a droop of the supply voltage has occurred; a clock generation circuit configured to output a first clock signal having a first frequency; and a clock modulation circuit configured to receive the detection signal and the first clock signal, and provide a system clock signal to the functional circuit.

20 Claims, 15 Drawing Sheets

(56) References Cited

U.S. PATENT DOCUMENTS

| | | | | |
|---|---|---|---|---|
| 2015/0022165 | A1* | 1/2015 | Sato | H02M 3/156 |
| | | | | 327/175 |
| 2019/0310587 | A1* | 10/2019 | Kim | H03L 7/095 |
| 2020/0089299 | A1* | 3/2020 | Kim | H03L 7/097 |
| 2022/0014208 | A1* | 1/2022 | Choi | H03M 3/322 |

OTHER PUBLICATIONS

Grenat, Aaron, et al., "Adaptive Clocking System for Improved Power Efficiency in a 28nm x86-64 Microprocessor", ISSCC 2014 / Session 5 / Processors / 5.6, pp. 106-108.

Igarashi, Mitsuhiko, et al., "A 28 nm High-k/MG Heterogeneous Multi-Core Mobile Application Processor With 2 GHz Cores and Low-Power 1 GHz Cores", IEEE Journal of Solid-State Circuits, vol. 50, No. 1, Jan. 2015, pp. 92-101.

Lefurgy, Charles R., et al., "Active Management of Timing Guardband to Save Energy in POWER7", MICRO 44, Dec. 3-7, 2011, 12 pages.

Singh, Teja, et al., "Zen: An Energy-Efficient High-Performance x86 Core", IEEE Journal of Solid-State Circuits, vol. 53, No. 1, Jan. 2018, pp. 102-114.

Wilcox, Kathyrn, et al., "Steamroller Module and Adaptive Clocking System in 28 nm CMOS", IEEE Journal of Solid-State Circuits, vol. 50, No. 1, Jan. 2015, pp. 24-34.

\* cited by examiner

LUT1

| MINIMUM CHANGE UNIT | RESOLUTION |
|---|---|
| x % | LV1 |
| y % | LV2 |

CLOCK GENERATOR FOR REDUCING POWER AND SYSTEM ON CHIP INCLUDING THE SAME

CROSS-REFERENCE TO RELATED APPLICATION

This application is based on, and claims priority under 35 U.S.C. § 119 to, Korean Patent Application No. 10-2020-0149599, filed on Nov. 10, 2020, in the Korean Intellectual Property Office, the disclosure of which is incorporated by reference herein in its entirety.

BACKGROUND

The inventive concepts relate to a clock generator, and more particularly, to a clock generator generating a system clock signal for reducing power consumed by a functional circuit and a system on chip including the clock generator.

A supply voltage of a high-performance functional circuit (or a semiconductor circuit) included in a system on chip (SoC) may use a method of setting a guard band to the supply voltage, so that the supply voltage is greater than a value needed in a normal state to accommodate for a droop phenomenon in which the supply voltage fluctuates (e.g., reduces) depending on an operating environment and a work performance level. The guard band refers to a value added to the value of the supply voltage in the normal state considering the droop phenomenon. However, because setting a high guard band may increase the power consumption of the system on chip, the competitiveness of a product may be deteriorated.

SUMMARY

The inventive concepts provide a clock generator to efficiently control power consumption of a functional circuit by adaptably reducing a frequency of a system clock signal provided to the functional circuit when a droop in a supply voltage is detected, and a system on chip including the clock generator.

A system on chip according to an embodiment of the inventive concepts includes: a functional circuit configured to perform a processing operation by receiving a supply voltage; a droop detection circuit configured to monitor the supply voltage and generate a detection signal indicating whether a droop of the supply voltage has occurred; a clock generation circuit configured to output a first clock signal having a first frequency; and a clock modulation circuit configured to receive the detection signal and the first clock signal, and provide a system clock signal to the functional circuit. The clock modulation circuit includes: a digital controlled oscillator configured to output a second clock signal in response to a digital control signal; a time-to-digital converter configured to respectively convert the first and second clock signals to first and second digital signals; a digital logic circuit configured to generate a target digital signal corresponding to a target frequency from the first digital signal, and output the digital control signal adjusted in a direction so that the second digital signal is identical to the target digital signal; and a multiplexer configured to output the first clock signal or the second clock signal as the system clock signal based on the detection signal.

A clock generator configured to provide a system clock signal to a functional circuit according to an embodiment of the inventive concepts includes: a clock generation circuit configured to generate a first clock signal having a first frequency; and a clock modulation circuit configured to generate a second clock signal having a second frequency from the first clock signal, where the second frequency of the second clock signal is less than the first frequency of the first clock signal. The clock modulation circuit includes: a digital controlled oscillator configured to output the second clock signal in response to a digital control signal; a time-to-digital converter configured to generate first and second digital signals respectively indicating the first and second frequencies of the first and second clock signals; a digital logic circuit configured to generate a target digital signal corresponding to a target frequency from the first digital signal, and adjust the digital control signal based on a comparison of the second digital signal to the target digital signal; and a multiplexer configured to output the first clock signal or the second clock signals as the system clock signal.

A system on chip according to an embodiment of the inventive concepts includes: a first functional circuit configured to perform a first processing operation by receiving a first supply voltage; a second functional circuit configured to perform a second processing operation by receiving a second supply voltage; a clock generation circuit configured to output a first clock signal having a first frequency; a first clock modulation circuit configured to provide, to the first functional circuit, a second clock signal having a first target frequency less than the first frequency of the first clock signal based on an occurrence of a droop of the first supply voltage; and a second clock modulation circuit configured to provide, to the second functional circuit, a third clock signal having a second target frequency less than the first frequency of the first clock signal based on an occurrence of a droop of the second supply voltage. The first clock modulation circuit includes a first voltage control oscillator configured to output the second clock signal in response to a first digital control signal, a first time-to-digital converter configured to respectively convert the first and second clock signals to first and second digital signals, and a first digital logic circuit configured to generate a first target digital signal corresponding to the first target frequency from the first digital signal, and adjust the first digital control signal by comparing the first target digital signal to the second digital signal. The second clock modulation circuit includes a second voltage control oscillator configured to output the third clock signal in response to a second digital control signal, a second time-to-digital converter configured to respectively convert the first and third clock signals to third and fourth digital signals, and a second digital logic circuit configured to generate a second target digital signal corresponding to the second target frequency from the third digital signal, and adjust the second digital control signal by comparing the second target digital signal to the fourth digital signal.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Hereinafter, embodiments of the inventive concept will be described in detail with reference to the accompanying drawings.

Figure 1:
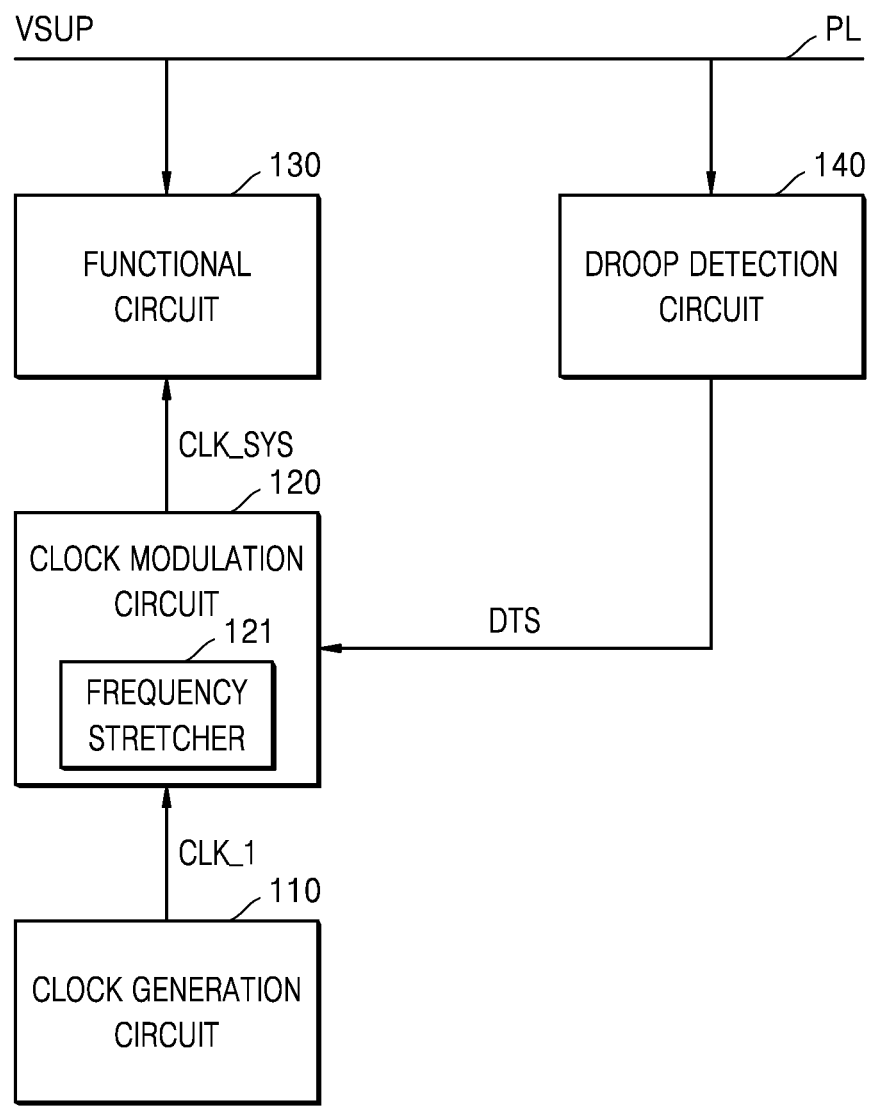
FIG. 1 is a block diagram of a system on chip according to an embodiment of the inventive concepts.

FIG. 1 is a block diagram of a system on chip 10a according to an embodiment of the inventive concepts. The system on chip 10a of FIG. 1 may also be referred to as an adaptable clock system.

Referring to FIG. 1, the system on chip 10a may include a clock generation circuit 110, a clock modulation circuit 120, a functional circuit 130, and a droop detection circuit 140. The functional circuit 130 may perform a certain processing operation by receiving a supply voltage VSUP via a power line PL. In an embodiment, the functional circuit 130 may be implemented with hardware such as a central processing unit, a graphics processing unit, a processor, and/or a modem.

The clock generation circuit 110 may generate a first clock signal CLK_1 having a frequency corresponding to an operation frequency of the functional circuit 130, when a normal supply voltage VSUP is provided to the functional circuit 130. The clock generation circuit 110 may be implemented as a phase locked loop (PLL) or a frequency locked loop (FLL).

The clock modulation circuit 120 according to an embodiment may include a frequency stretcher 121. The frequency stretcher 121 may generate a second clock signal having a target frequency from the first clock signal CLK_1 in a digital domain based on a time-to-digital conversion method. In an embodiment, the frequency stretcher 121 may set the target frequency lower than a frequency of the first clock signal CLK_1, and may adaptably adjust the target frequency according to an operating environment and a work performance level of the functional circuit 130.

The droop detection circuit 140 according to an embodiment may monitor the supply voltage VSUP via the power line PL, and generate a detection signal DTS indicating whether a droop of the supply voltage VSUP has occurred and provide the generated detection signal DTS to the clock modulation circuit 120. For example, when the supply voltage VSUP falls below a reference voltage, the droop detection circuit 140 may generate the detection signal DTS of a high level, and when the supply voltage VSUP is equal to or greater than the reference voltage, the droop detection circuit 140 may generate the detection signal DTS of a low level. In some embodiments, the droop detection circuit 140 may generate the detection signal DTS being configured with a plurality of bits so that droop generation of the supply voltage VSUP and the degree of the generated droop are indicated by using a plurality of reference voltages having different levels from each other. In this case, the frequency stretcher 121 may adjust the target frequency according to the droop degree of the supply voltage VSUP. For example, the frequency stretcher 121 may adjust the target frequency to be lower as the droop degree of the supply voltage VSUP increases. In addition, the frequency stretcher 121 may adjust the target frequency to adaptably increase as the drooped supply voltage VSUP is recovered. Details of this operation are described later. An operation of the frequency stretcher 121 may be defined as an operation of the clock modulation circuit 120.

In an embodiment, the clock modulation circuit 120 may provide any one of the first clock signal CLK_1 and the second clock signal as a system clock signal CLK_SYS to the functional circuit 130 in response to the detection signal DTS. For example, the clock modulation circuit 120 may select the second clock signal as the system clock signal CLK_SYS in response to the detection signal DTS indicating that the droop of the supply voltage VSUP has occurred, and provide the selected second clock signal to the functional circuit 130. Then, the clock modulation circuit 120 may select the first clock signal CLK_1 as the system clock signal CLK_SYS in response to the detection signal DTS indicating that the droop of the supply voltage VSUP has not occurred and provide the selected first clock signal CLK_1 to the functional circuit 130.

When the droop of the supply voltage VSUP occurs, the functional circuit 130 may perform a processing operation based on the system clock signal CLK_SYS having a lower frequency than before, and accordingly, reduce power consumption of the functional circuit 130 for a certain time. In this manner, by accelerating the recovery of the drooped supply voltage VSUP, a stable operation of the system on chip 10a may be possible, and the guard band applied to the supply voltage VSUP may be reduced. Accordingly, the overall amount of power consumed by the system on chip 10a may be reduced.

Hereinafter, a configuration including the clock generation circuit 110 and the clock modulation circuit 120 may be defined as a clock generator. The clock generator according to an embodiment may lower the frequency of the system clock signal CLK_SYS when the droop of the supply voltage VSUP has occurred, and provide the lowered frequency to the functional circuit 130.

Figure 2:
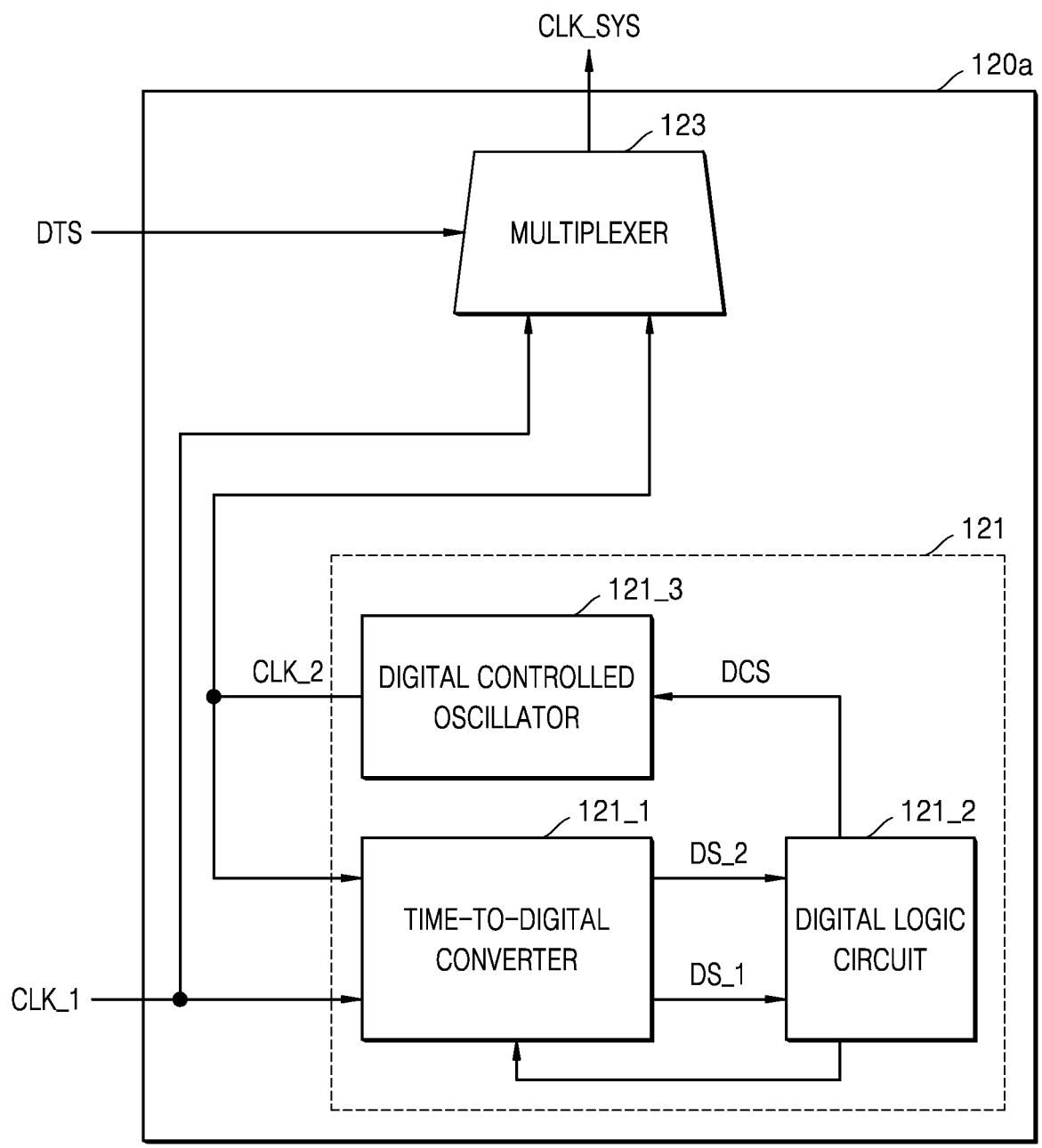
FIG. 2 is a block diagram of a clock modulation circuit in FIG. 1.

FIG. 2 is a block diagram of the clock modulation circuit 120a in FIG. 1.

Referring to FIG. 2, the clock modulation circuit 120a may include the frequency stretcher 121 and a multiplexer 123. The frequency stretcher 121 may include a time-to-digital converter 121_1, a digital logic circuit 121_2, and a digital controlled oscillator 121_3. The time-to-digital converter 121_1 may receive the first and second clock signals CLK_1 and CLK_2, and convert them into first and second digital signals DS_1 and DS_2, respectively. For example, the first digital signal DS_1 may be configured with k (where k is an integer equal to or greater than 2) bits, and may have a value indicating the frequency of the first clock signal CLK_1. The second digital signal DS_2 may be configured with k bits, and may have a value indicating a frequency of the second clock signal CLK_2. In an embodiment, the number of bits of the first and second digital signals DS_1 and DS_2 may vary according to a resolution of the time-to-digital converter 121_1. The second clock signal CLK_2 may be output by the digital controlled oscillator 121_3.

The digital logic circuit 121_2 may generate a target digital signal corresponding to the target frequency from the first digital signal DS_1. In an embodiment, the digital logic circuit 121_2 may reflect a frequency stretching rate, which represents a ratio of the frequency of the first clock signal CLK_1 over the target frequency, to the first digital signal DS_1, and may generate the target digital signal. Below, for convenience of description, the frequency stretching rate will be expressed in percent. For example, when the frequency stretching rate is about 90%, the target frequency may have a value of about 90% of the frequency of the first clock signal CLK_1. In an embodiment, the digital logic circuit 121_2 may adjust the frequency stretching rate adaptably with respect to various factors such as a droop degree of a supply voltage and an operating environment of a functional circuit. Furthermore, the digital logic circuit 121_2 may adjust the minimum change unit of the frequency stretching rate. The minimum change unit of the frequency stretching rate may mean an interval between adjacent rates among the frequency stretching rates that are provided by the digital logic circuit 121_2. For example, the minimum change unit may be variously adjusted as about 1%, about 5%, about 10%, etc. In addition, in an embodiment, the frequency stretching rate may correspond to any one of about 70% or more and about 95% or less, and furthermore, may be adjusted by the minimum change unit within the aforementioned range.

The digital logic circuit 121_2 may compare the target digital signal to the second digital signal DS_2, and generate a digital control signal DCS based on the comparison result. As a particular example, the digital logic circuit 121_2 may compare the second digital signal DS_2 to the target digital signal, and adjust the digital control signal DCS based on a binary search method. The digital controlled oscillator 121_3 may output the second clock signal CLK_2 based on the digital control signal DCS. The digital logic circuit 121_2 may match the second digital signal DS_2 to the target digital signal by repeating a plurality of times a loop including the digital logic circuit 121_2, the digital controlled oscillator 121_3, and the time-to-digital converter 121_1. As a result, the second clock signal CLK_2 output by the digital controlled oscillator 121_3 may have the same or very similar frequency to the target frequency.

The multiplexer 123 may output one of the first and second clock signals CLK_1 and CLK_2 as the system clock signal CLK_SYS in response to the detection signal DTS. For example, the multiplexer 123 may select and output the first clock signal CLK_1 as the system clock signal CLK_SYS when the droop of the supply voltage does not occur or the drooped supply voltage is recovered. When the droop of the supply voltage occurs, the multiplexer 123 may select and output the second clock signal CLK_2 as the system clock signal CLK_SYS.

The clock modulation circuit 120a according to an embodiment may reduce power consumed by the clock modulation circuit 120a and a design area of the clock modulation circuit 120a by generating the system clock signal CLK_SYS having an adaptable frequency by using the time-to-digital converter 121_1 in the digital domain.

Figure 3:
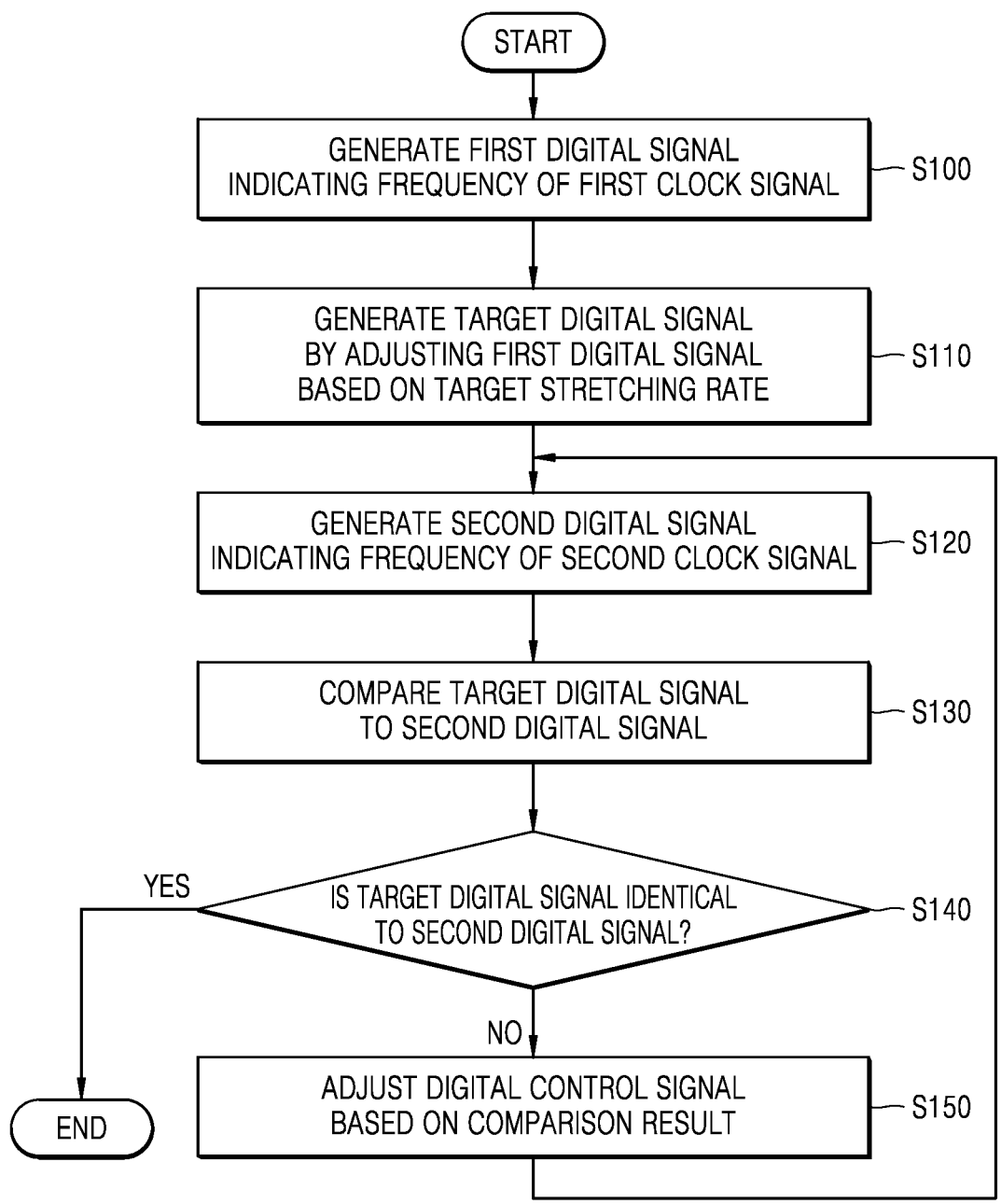
FIG. 3 is a flowchart of an operation method of the clock modulation circuit in FIG. 2.

FIG. 3 is a flowchart of an operation method of the clock modulation circuit 120a in FIG. 2.

Referring to FIG. 3, the clock modulation circuit 120a may generate the first digital signal representing the frequency of the first clock signal (S100). As described above, the first clock signal may be referred to as a clock signal that is provided to the functional circuit when no droop occurs in the supply voltage or the drooped supply voltage is recovered. The clock modulation circuit 120a may generate the target digital signal by adjusting the first digital signal based on the target stretching rate (S110). The clock modulation circuit 120a may generate a second digital signal representing a frequency of the second clock signal (S120). As described above, the second clock signal may be generated by a digital controlled oscillator in the clock modulation circuit 120a, and may be referred to as a clock signal provided to the functional circuit when a droop occurs in the supply voltage. The clock modulation circuit 120a may compare the target digital signal to the second digital signal (S130). The clock modulation circuit 120a may determine whether the target digital signal is the same as the second digital signal (S140). When a result of operation S140 is 'YES', the clock modulation circuit 120a may control the current digital control signal to be fixed so that the digital controlled oscillator can continuously output the second clock signal having the target frequency in response to the fixed digital control signal. When the result of operation S140 is 'NO', the clock modulation circuit 120a may adjust the digital control signal based on the determination result (S150), and then provide the digital control signal to the digital controlled oscillator. The clock modulation circuit 120a may perform operation S120 again by using the second clock signal that is output by the digital controlled oscillator in response to the adjusted digital control signal.

Figure 4:
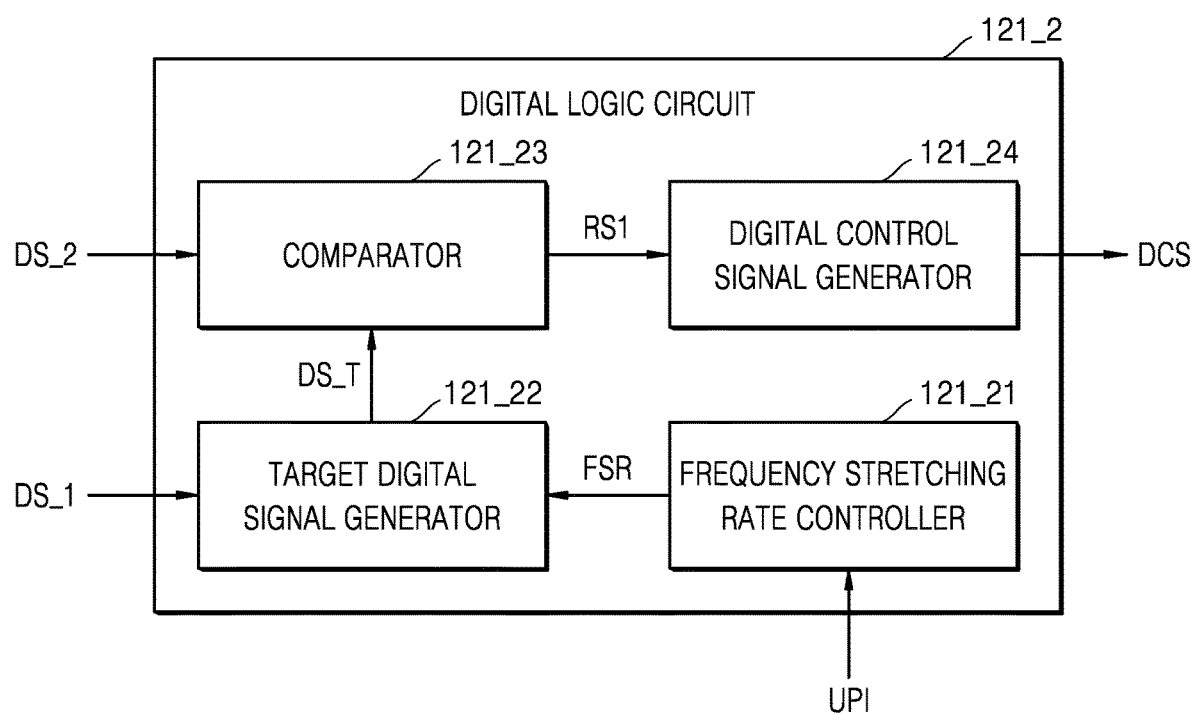
FIG. 4 is a block diagram of a digital logic circuit according to an embodiment of the inventive concepts.

FIG. 4 is a block diagram of the digital logic circuit 121_2 according to an embodiment of the inventive concepts.

Referring to FIG. 4, the digital logic circuit 121_2 may include a frequency stretching rate controller 121_21, a target digital signal generator 121_22, a comparator 121_23, and a digital control signal generator 121_24.

The frequency stretching rate controller 121_21 may provide a certain frequency stretching rate signal FSR to the target digital signal generator 121_22. In an embodiment, the frequency stretching rate signal FSR may be referred to as a digital signal in which a magnitude of the frequency stretching rate is relatively expressed. In an embodiment, the frequency stretching rate controller 121_21 may set the frequency stretching rate based on a user programmable input UPI from the outside. A user may change the user programmable input UPI to match the desired frequency stretching rate. In some embodiments, the frequency stretching rate controller 121_21 may adaptably change the frequency stretching rate with respect to the droop degree of the supply voltage, the operating environment of the functional circuit, etc.

The target digital signal generator 121_22 may generate a target frequency signal DS_T by reflecting the frequency stretching rate signal FSR to the received first digital signal DS_1. For example, the target digital signal generator 121_22 may subtract the frequency stretching rate signal FSR from the received first digital signal DS_1, or may relatively easily generate the target frequency signal DS_T by using an arithmetic computation such as adding, etc. The target digital signal generator 121_22 may provide the generated target frequency signal DS_T to the comparator 121_23.

The comparator 121_23 may compare the received second digital signal DS_2 to the target digital signal DS_T, and determine whether they are the same as each other. In some embodiments, the comparator 121_23 may determine whether a difference between the second digital signal DS_2 and the target digital signal DS_T is within a certain range, and when the difference is within the certain range, the comparator 121_23 may consider that the second digital signal DS_2 is the same as the target digital signal DS_T. The comparator 121_23 may generate a comparison result signal RS1 indicating whether the second digital signal DS_2 is the same as the target digital signal DS_T, and provide the comparison result signal RS1 to the digital control signal generator 121_24.

The digital control signal generator 121_24 may adjust the digital control signal DCS that is provided to the digital controlled oscillator based on the comparison result signal RS1. For example, when the target digital signal DS_T is greater than the second digital signal DS_2, the digital control signal generator 121_24 may increase a value of the digital control signal DCS, and when the target digital signal DS_T is less than the second digital signal DS_2, the digital control signal generator 121_24 may reduce the value of the digital control signal DCS. When the target digital signal DS_T matches or is very similar to the second digital signal DS_2, the digital control signal generator 121_24 may fix the digital control signal DCS, and may provide the fixed digital control signal DCS to a digital controlled oscillator. In this manner, the digital controlled oscillator may output a second clock signal that has the target frequency or a frequency very similar to the target frequency.

Figures 5A, 5B:
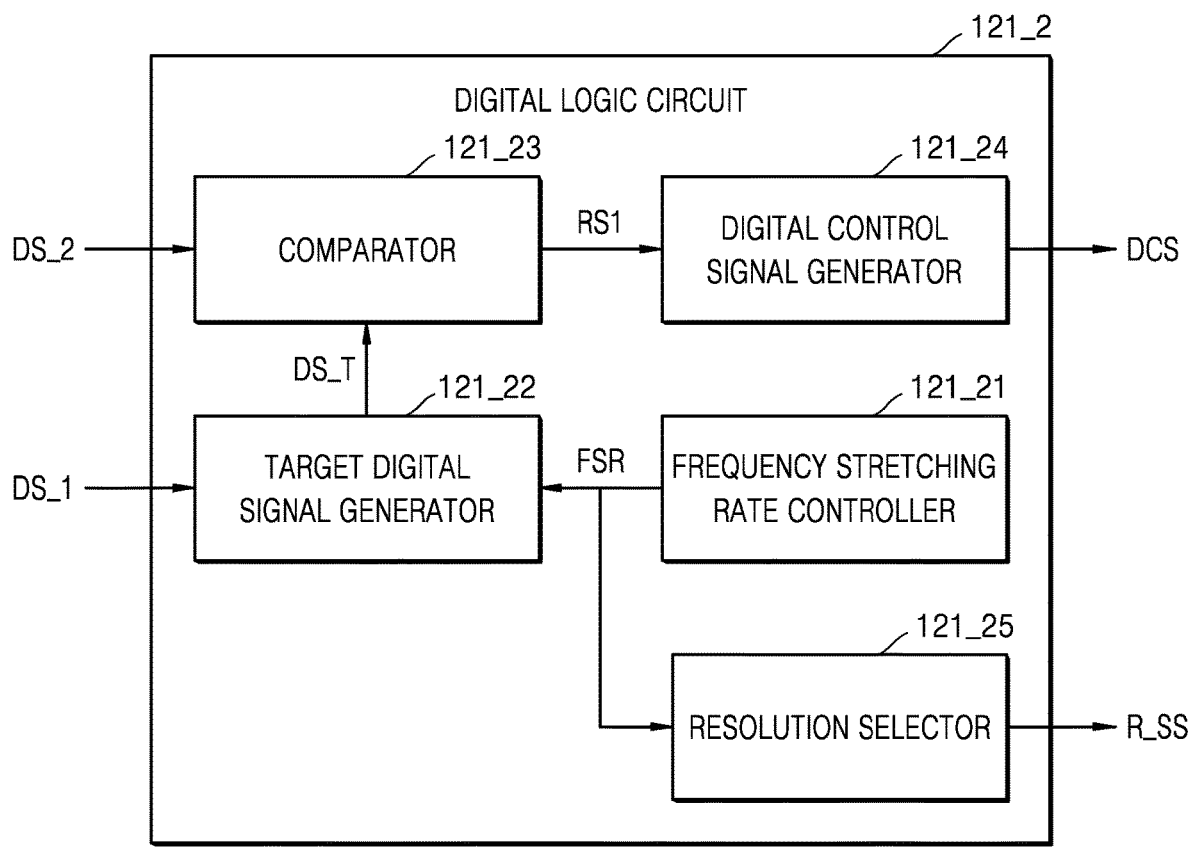
FIG. 5A is a block diagram illustrating a digital logic circuit according to an embodiment of the inventive concepts.
FIG. 5B is a lookup table for explaining an operation of a resolution selector in FIG. 5A.

FIG. 5A is a block diagram of the digital logic circuit 121_2 according to an embodiment of the inventive concepts, and FIG. 5B is a lookup table LUT1 for explaining an operation of a resolution selector 121_25 in FIG. 5A.

Referring to FIG. 5A, the digital logic circuit 121_2 may further include the resolution selector 121_25, compared to FIG. 4. The resolution selector 121_25 may receive the frequency stretching rate signal FSR, and generate a resolution setting signal R_SS based on the frequency stretching rate signal FSR. The resolution setting signal R_SS may be referred to a signal provided to the time-to-digital converter (121_1 in FIG. 2) so that the time-to-digital converter (121_1 in FIG. 2) operates at a resolution corresponding to the minimum change unit of the frequency stretching rate. For example, the resolution selector 121_25 may set the time-to-digital converter (121_1 in FIG. 2) to operate at a higher resolution as the minimum change unit of the frequency stretching rate decreases. The number of bits of the first and second digital signals DS_1 and DS_2 output from the time-to-digital converter (121_1 in FIG. 2) may vary according to a set resolution.

The resolution selector 121_25 may generate the resolution setting signal R_SS by referring to the lookup table LUT1 of FIG. 5B. Referring further to FIG. 5B, the resolution selector 121_25 may set the resolution of the time-to-digital converter (121_1 in FIG. 2) to be a first level LV1 when the minimum change unit of the frequency stretching rate is 'x' %, and may set the resolution of the time-to-digital converter (121_1 in FIG. 2) to be a second level LV2 when the minimum change unit of the frequency stretching rate is 'y' %. The lookup table LUT1 of FIG. 5B is only an embodiment, and the inventive concepts are not limited thereto, and various resolutions respectively corresponding to more various minimum change units may be included in the lookup table LUT1. Hereinafter, descriptions previously given with reference to FIG. 4 are omitted.

Figure 6:
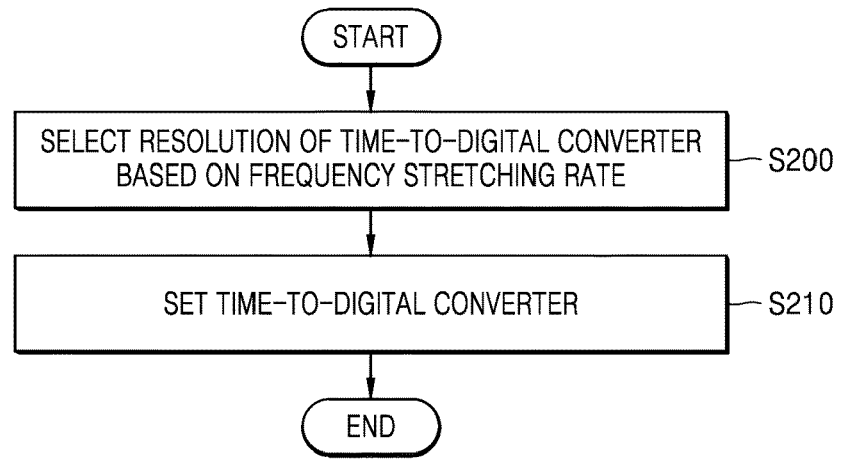
FIG. 6 is a flowchart of an operation method of the digital logic circuit of FIG. 5.

FIG. 6 is a flowchart of an operation method of the digital logic circuit 121_2 of FIG. 5.

Referring to FIG. 6, the digital logic circuit may select a resolution of a time-to-digital converter based on a frequency stretching rate (S200). As an example, the digital logic circuit may receive, from the user, an input indicating the frequency stretching rate desired by the user, and set various parameters including the resolution of the time-to-digital converter by reflecting the received input. For example, the digital logic circuit may select the resolution of the time-to-digital converter according to the minimum change unit of the frequency stretching rate. The digital logic circuit may set the time-to-digital converter based on the selected resolution (S210).

The digital logic circuit according to an embodiment may reduce unnecessary computations and power consumption in outputting the second clock signal having the target frequency by adaptably selecting the resolution of the time-to-digital converter according to the minimum change unit of the frequency stretching rate.

Figure 7:
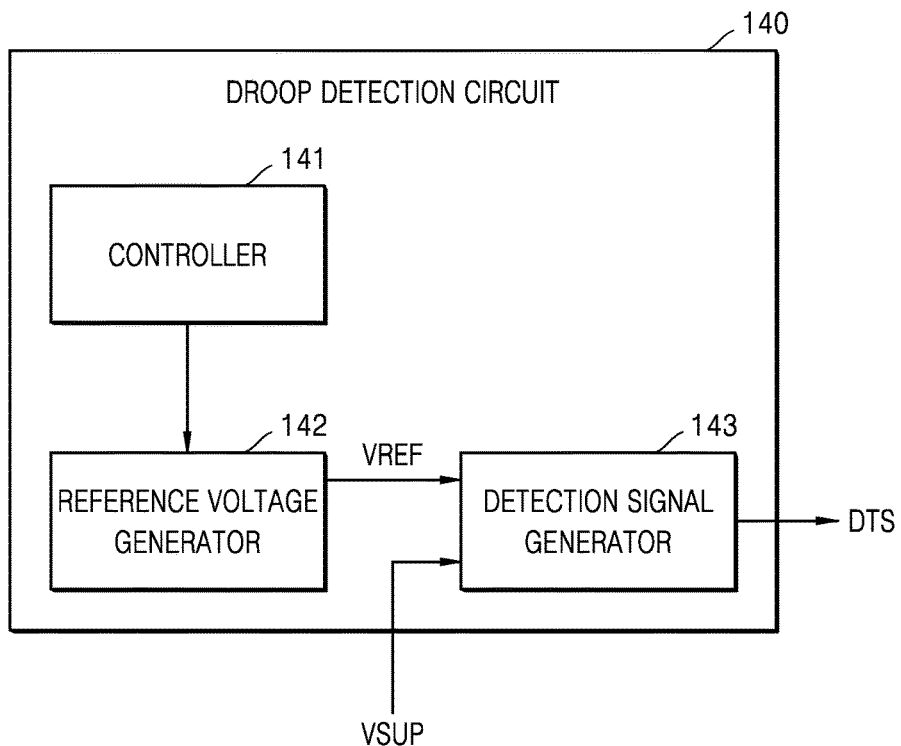
FIG. 7 is a block diagram of a droop detection circuit according to an embodiment of the inventive concepts.

FIG. 7 is a block diagram of the droop detection circuit 140 according to an embodiment of the inventive concepts.

Referring to FIG. 7, the droop detection circuit 140 may include a controller 141, a reference voltage generator 142, and a detection signal generator 143. The controller 141 may control all operations of the droop detection circuit 140 to detect whether the supply voltage VSUP is drooped. The reference voltage generator 142 may provide a reference voltage VREF to the detection signal generator 143 in response to a control signal from the controller 141. The detection signal generator 143 may determine whether a droop occurs by checking whether the supply voltage VSUP is less than the reference voltage VREF. In addition, the detection signal generator 143 may determine whether the supply voltage VSUP has been recovered by checking whether the drooped supply voltage VSUP is equal to or greater than the reference voltage VREF. The detection signal generator 143 may generate the detection signal DTS based on the determination result, and provide the generated detection signal DTS to the clock modulation circuit (120 in FIG. 1). In an embodiment, the detection signal generator 143 may include a comparator for comparing the supply voltage VSUP to the reference voltage VREF.

In an example embodiment, the reference voltage generator 142 may provide a plurality of reference voltages VREF to the detection signal generator 143. The detection signal generator 143 may determine the detection signal DTS configured with a plurality of bits indicating the droop degree of the supply voltage VSUP when a droop occurs, by specifically determining a magnitude of the supply voltage VSUP by respectively comparing the supply voltage VSUP to the plurality of reference voltages VREF. In an embodiment, the detection signal generator 143 may include a plurality of comparators for respectively comparing the supply voltage VSUP to the plurality of reference voltages VREF.

Figure 8:
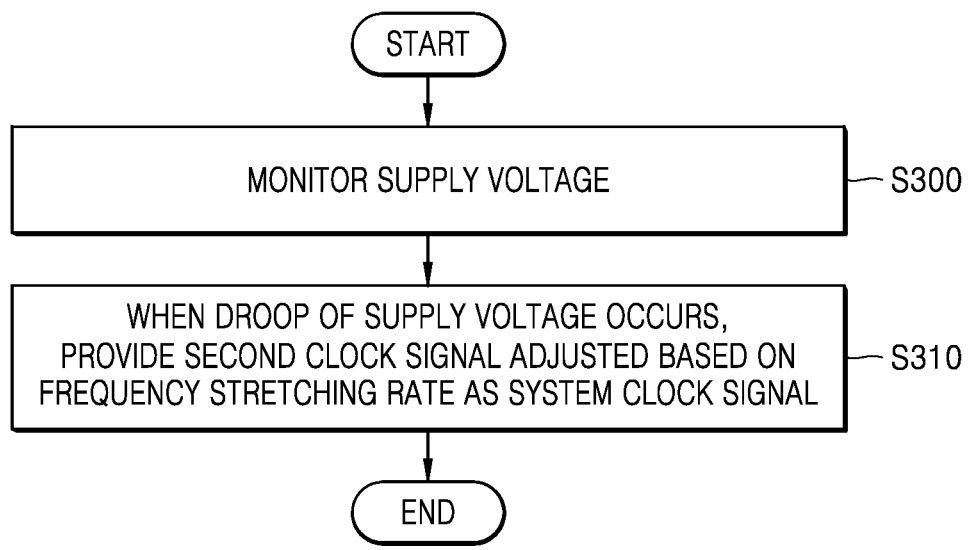
FIG. 8 is a flowchart describing an operation method of a system on chip, according to an embodiment of the inventive concepts.

FIG. 8 is a flowchart describing an operation method of a system on chip, according to an embodiment of the inventive concepts. Hereinafter, FIG. 1 is further referred to for better understanding.

Referring to FIGS. 1 and 8, the droop detection circuit 140 may monitor the supply voltage VSUP provided to the functional circuit 130 (S300). When a droop occurs in the supply voltage VSUP, the clock modulation circuit 120 may provide the second clock signal in which a frequency thereof is adjusted based on the frequency stretching rate as the system clock signal CLK_SYS to the functional circuit 130 (S310).

Figure 9:
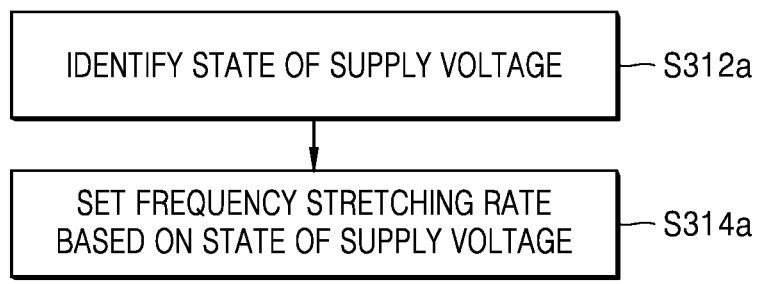
FIG. 9 is a flowchart for describing operation S310 in FIG. 8 in detail.

FIG. 9 is a flowchart for describing operation S310 in FIG. 8 in detail. Hereinafter, as described with reference to FIG. 7, it is assumed that the detection signal generator 143 may respectively compare the supply voltage VSUP to the plurality of reference voltages VREF, and generate the detection signal DTS based on the comparison result.

Referring to FIGS. 1 and 9, the clock modulation circuit 120 may identify the state of the supply voltage VSUP from the detection signal DTS (S312a). In other words, when the supply voltage VSUP is drooped, the clock modulation circuit 120 may identify the drooping degree of the supply voltage VSUP from the detection signal DTS. The clock modulation circuit 120 may set the frequency stretching rate based on the state of the supply voltage VSUP (S314a). For example, the clock modulation circuit 120 may set the frequency stretching rate lower as the droop degree of the supply voltage VSUP increases. In other words, the clock modulation circuit 120 may adaptably reduce unnecessary power consumption of the functional circuit 130 by adjusting the frequency of the system clock signal CLK_SYS provided to the functional circuit 130 to be lower as the droop magnitude of the supply voltage VSUP increases.

Figure 10A:
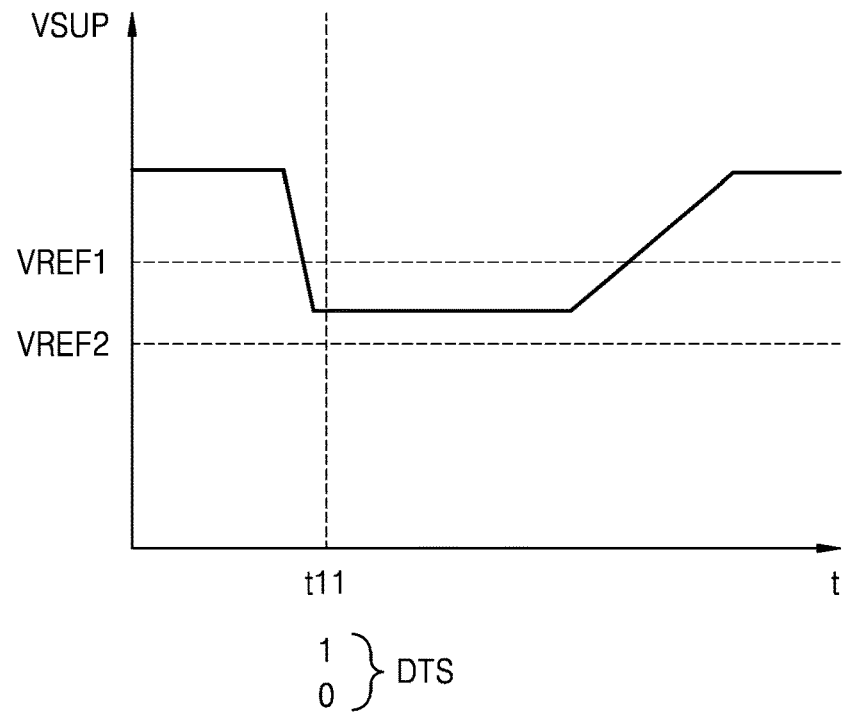
FIGS. 10A and 10B are graphs for describing an operation of the droop detection circuit.
Figure 10B:
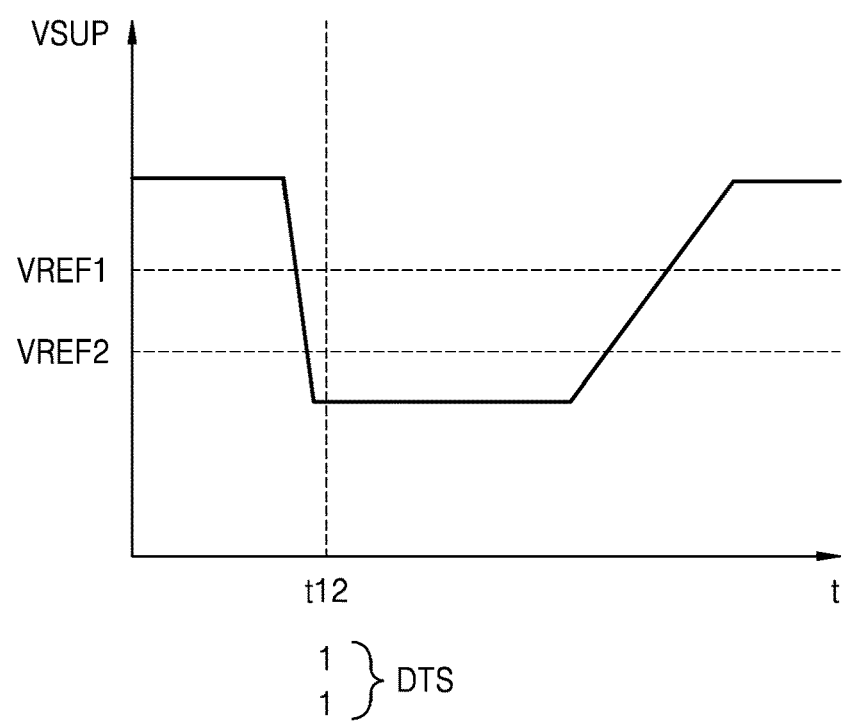
Figures 10C, 10D:
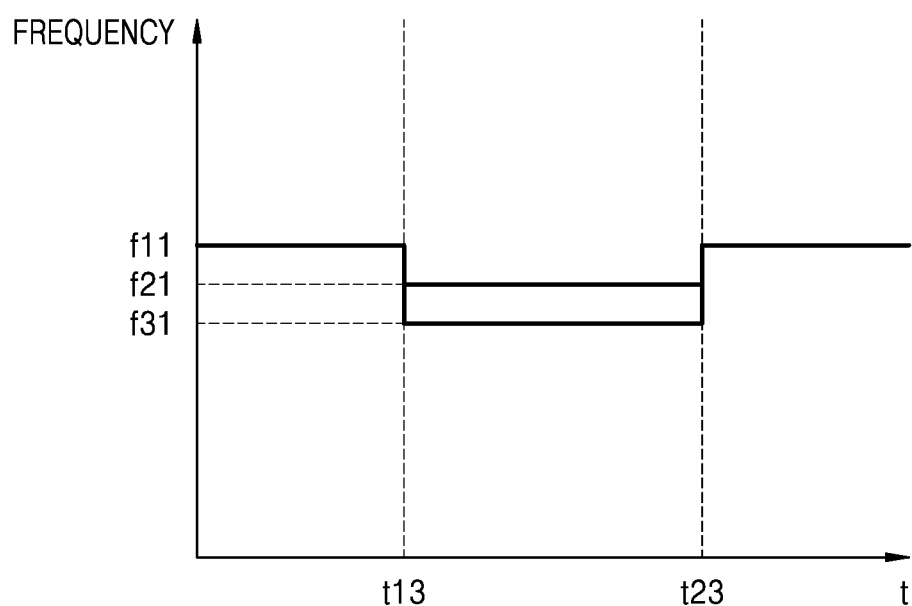
FIG. 10C is a lookup table for describing an operation of the digital logic circuit of FIG. 5A.
FIG. 10D is a graph of a system clock signal generated by the digital logic circuit described with reference to FIG. 10C.

FIGS. 10A and 10B are graphs for describing an operation of the droop detection circuit 140 of FIG. 7, FIG. 10C is a lookup table LUT2 for describing an operation of the digital logic circuit 121_2 of FIG. 5A, and FIG. 10D is a graph of a system clock signal CLK_SYS generated by the digital logic circuit 121_2 described with reference to FIG. 10C.

Referring to FIGS. 7 and 10A, the detection signal generator 143 may compare the first and second reference voltages VREF1 and VREF2 to the drooped supply voltage VSUP at a first time point t11, and may generate the detection signal DTS based on the comparison result. For example, the drooped supply voltage VSUP may be less than the first reference voltage VREF1, and greater than the second reference voltage VREF2, and the detection signal generator 143 may generate the detection signal DTS having a value of '10' representing the state of the drooped supply voltage VSUP. In some embodiments, the detection signal DTS may include multiple bits, with respective bits of the detection signal DTS corresponding to one of the reference voltages, and a value of the bit may indicate whether the supply voltage VSUP is less than the corresponding reference voltage.

Referring further to FIG. 10B, the detection signal generator 143 may compare the first and second reference voltages VREF1 and VREF2 to the drooped supply voltage VSUP at a second time point t12, and may generate the detection signal DTS having a value of '11' representing the state of the drooped supply voltage VSUP.

Referring further to FIGS. 5A and 10C, a frequency stretching ratio controller 121_22 may receive the detection signal DTS, and may set the frequency stretching rate corresponding to the value of the detection signal DTS by referring to the lookup table LUT2. The lookup table LUT2 may include frequency stretching rates R1 and R2 respectively corresponding to detection signal values V1 and V2. However, the lookup table LUT2 may be only an embodiment, and the inventive concepts are not limited thereto, and the lookup table LUT2 may include frequency stretching rates respectively corresponding to more various values of the detection signals V1 and V2.

Referring further to FIGS. 1 and 10D, the frequency of the system clock signal CLK_SYS may be adjusted to be low by the clock modulation circuit 120 due to the droop occurrence of the supply voltage VSUP between a third time point t13 and a fourth time point t23. In an embodiment, the system clock signal CLK_SYS may have a first frequency f11 before the droop occurrence of the supply voltage VSUP, and may be adjusted to any one of second and third frequencies f21 and f31 after the droop occurrence of the supply voltage VSUP.

Figure 11A:
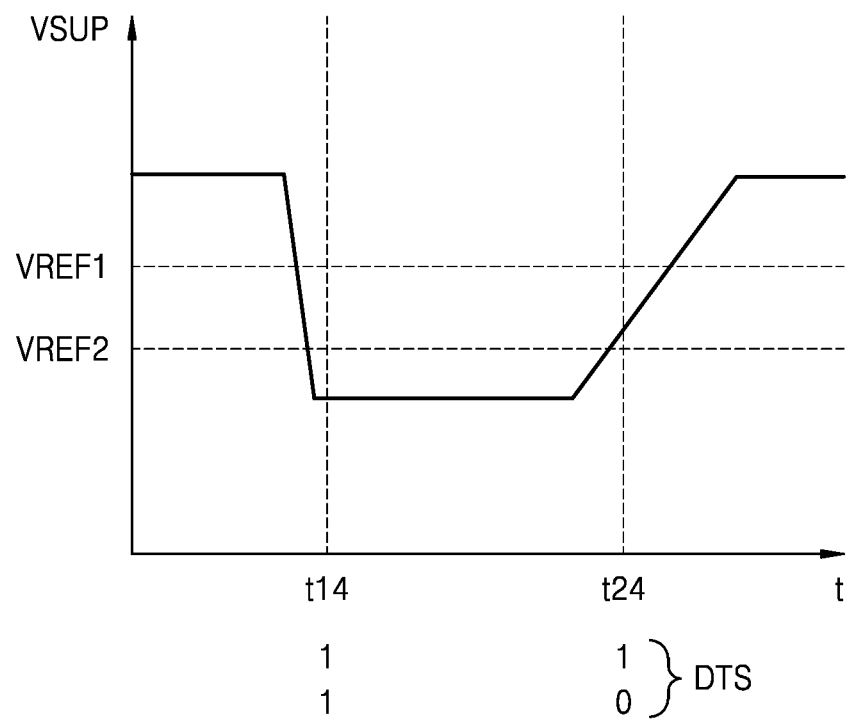
FIGS. 11A and 11B are graphs for describing a clock modulation circuit, according to embodiments of the inventive concepts.
Figure 11B:
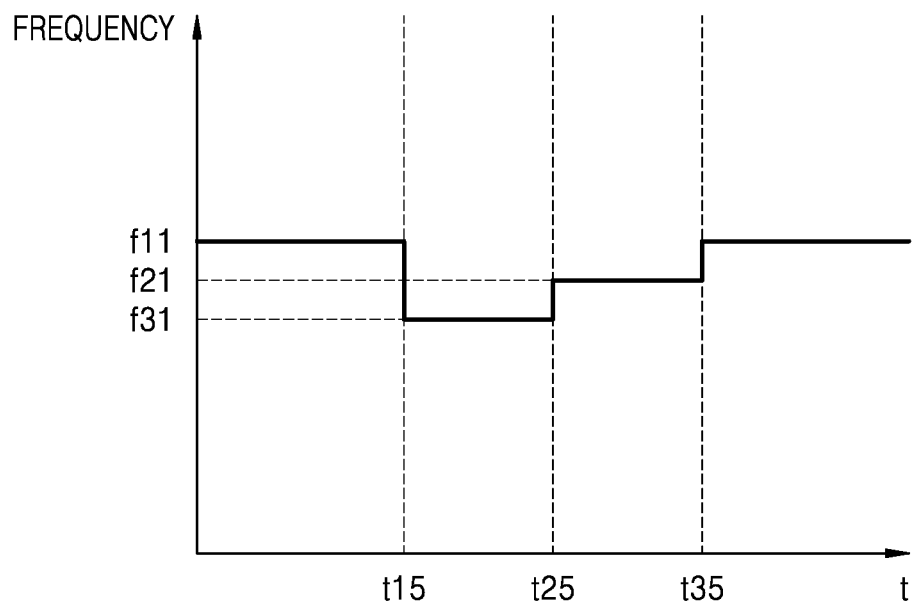

FIGS. 11A and 11B are graphs for describing a clock modulation circuit, according to embodiments of the inventive concepts.

Referring to FIGS. 7 and 11A, the detection signal generator 143 may compare the first and second reference voltages VREF1 and VREF2 to the drooped supply voltage VSUP at a first time point t14, and may generate the detection signal DTS having a value of '11'. Thereafter, the detection signal generator 143 may compare the first and second reference voltages VREF1 and VREF2 to the recovered supply voltage VSUP at a second time t24, and may generate the detection signal DTS having a value of '10'.

Referring further to FIGS. 1 and 11B, the frequency of the system clock signal CLK_SYS may be adjusted to be low by the clock modulation circuit 120 due to the droop occurrence of the supply voltage VSUP between a third time point t15 and a fifth time point t35. Between the third time point t15 and the fifth time point t35, the frequency of the system clock signal CLK_SYS may be adjusted by the clock modulation circuit 120 due to the droop occurrence of the supply voltage VSUP. In an embodiment, the clock modulation circuit 120 may adjust the frequency of the system clock signal CLK_SYS from the first frequency f11 to the third frequency f31 between the third time t15 and the fourth time t25 in response to the detection signal DTS having a value of '11'. Thereafter, the clock modulation circuit 120 may adjust the frequency of the system clock signal CLK_SYS from the third frequency f31 to the second frequency f21 between the fourth time t25 and the fifth time t35 in response to the detection signal DTS having a value of '10'.

The clock modulation circuit 120 may change the frequency of the system clock signal CLK_SYS step by step as the drooped supply voltage VSUP is recovered. In other words, the clock modulation circuit 120 may restore the frequency of the system clock signal CLK_SYS to the original state (that is, the first frequency f11) step by step, by adaptably setting the frequency stretching rate corresponding to the magnitude of the supply voltage VSUP as the supply voltage VSUP is recovered by continuously monitoring the drooped supply voltage VSUP.

The clock modulation circuit 120 according to an embodiment may reduce the burden on the functional circuit 130 by changing the frequency of the system clock signal CLK_SYS to the functional circuit 130 step by step to prevent a rapid frequency change.

In some embodiments, the clock modulation circuit 120 may change the frequency of the system clock signal CLK_SYS step by step as the supply voltage VSUP is drooped. In other words, the clock modulation circuit 120 may lower the frequency of the system clock signal CLK_SYS step by step by adjusting the frequency stretching rate to increase step by step as the supply voltage VSUP falls.

Figure 12:
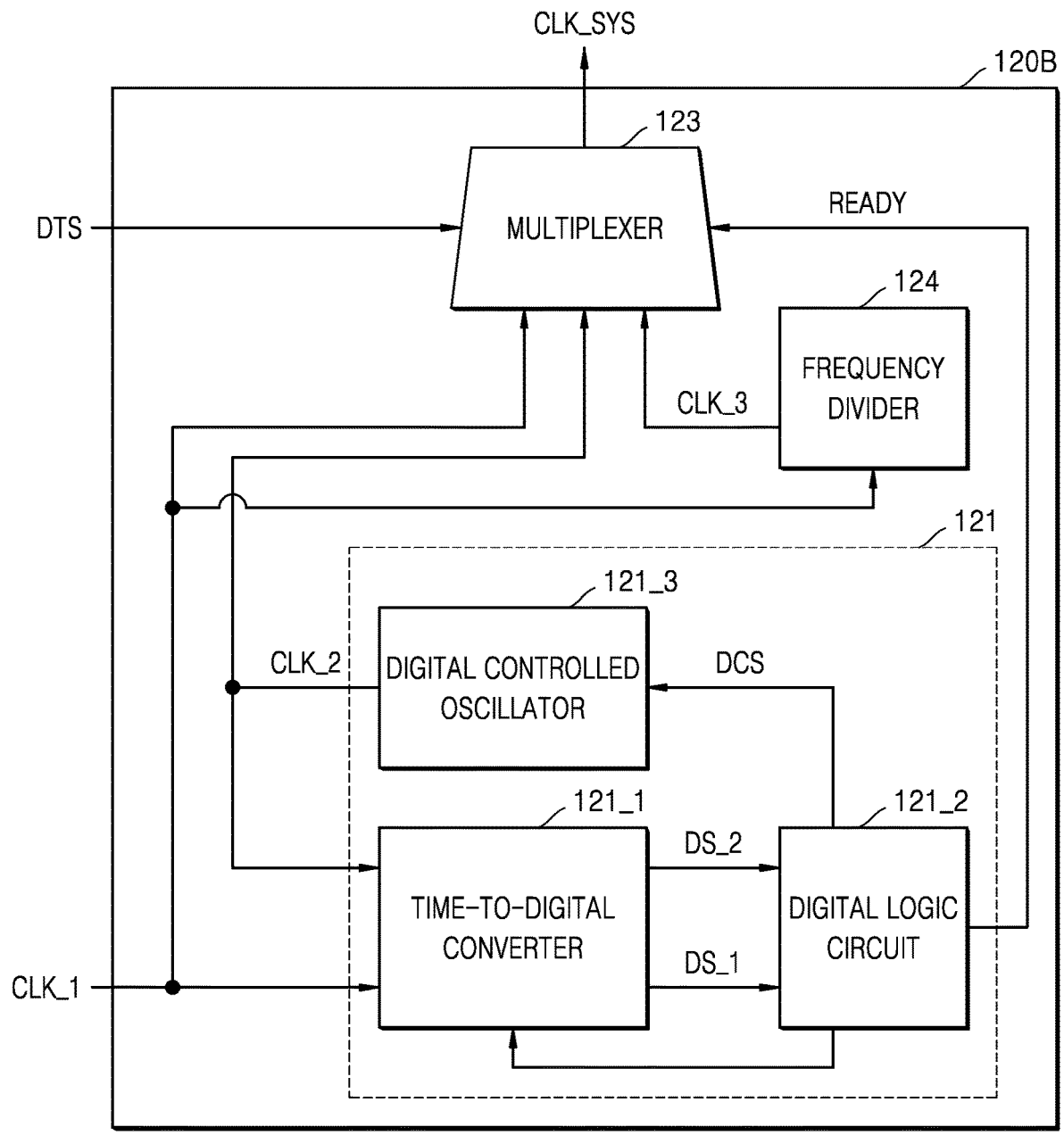
FIG. 12 is a block diagram describing a clock modulation circuit in detail, according to an embodiment of the inventive concepts.
Figure 13:
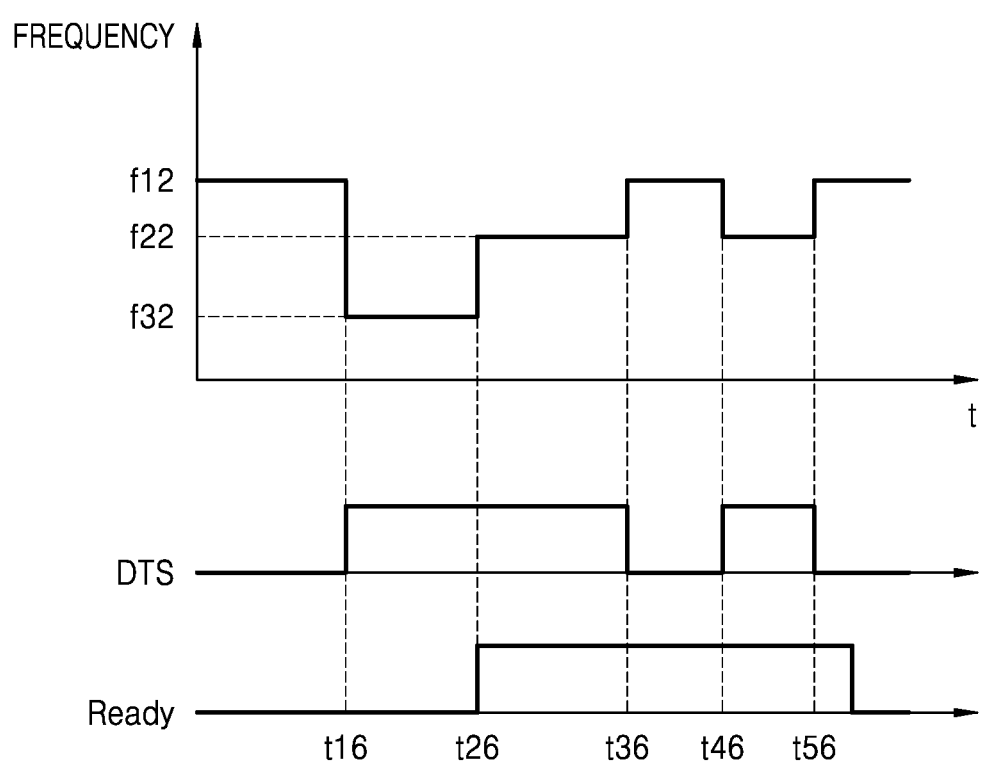
FIG. 13 is a graph for describing an operation of the clock modulation circuit of FIG. 12.

FIG. 12 is a block diagram describing a clock modulation circuit 120b in detail, according to an embodiment, and FIG. 13 is a graph for describing an operation of the clock modulation circuit 120b of FIG. 12.

Referring to FIG. 12, the clock modulation circuit 120b may further include a frequency divider 124 as compared to the clock modulation circuit 120a of FIG. 3. The frequency divider 124 may divide the frequency of the first clock signal CLK_1, and generate a third clock signal CLK_3. In an embodiment, a frequency of the third clock signal CLK_3 may be different from the frequency of the second clock signal CLK_2. In some embodiments, the frequency of the third clock signal CLK_3 may be less than the frequency of the second clock signal CLK_2. As an example, the frequency of the second clock signal CLK_2 may have a value desired by the user in accordance with the user programmable input (UPI in FIG. 4), and the frequency of the third clock signal (CLK_3) may depend on the dividing ability of the frequency divider 124. The digital logic circuit 121_2 may generate a ready signal Ready indicating whether the second clock signal CLK_2 is ready. The readiness of the second clock signal CLK_2 may be defined as a state in which the digital controlled oscillator 121_3 outputs the second clock signal CLK_2 having the target frequency, or as a state in which the frequency stretcher 121 is ready.

The multiplexer 123 may output any one of the first through third clock signals CLK_1 through CLK_3 as the system clock signal CLK_SYS based on a detection signal DTS and the ready signal Ready. For example, when the droop of the supply voltage VSUP is detected and the second clock signal CLK_2 is not ready, the multiplexer 123 may output the third clock signal CLK_3 as the system clock signal CLK_SYS. When the second clock signal CLK_2 is ready while the third clock signal CLK_3 is in the middle of being output as the system clock signal CLK_SYS, the multiplexer 123 may output the second clock signal CLK_2 as the system clock signal CLK_SYS.

In this manner, when the droop of the supply voltage VSUP occurs, the clock modulation circuit 120b may secure a preparation period of the frequency stretcher 121 by outputting the third clock signal CLK_3 as the system clock signal CLK_SYS until the frequency stretcher 121 is ready, and may prepare for a state in which the frequency stretcher 121 does not operate.

Referring further to FIG. 13, a section where the droop of the supply voltage VSUP is detected may be between a first time point t16 and a third time point t36, and between a fourth time point t46 and a fifth time point t56, and in this section, the detection signal DTS may be at a high level. A section where the second clock signal CLK_2 is ready may be between a second time point t26 and a sixth time point t66, and in this section, the ready signal Ready may be at a high level.

In an embodiment, the multiplexer 123 may output the first clock signal CLK_1, which has a first frequency f12 until the first time point t16, as the system clock signal CLK_SYS. Because the droop of the supply voltage VSUP has been detected between the first time point t16 and the second time point t26 and the second clock signal CLK_2 is not ready, the multiplexer 123 may output the third clock signal CLK_3, which has a third frequency f32 first, as the system clock signal CLK_SYS. Thereafter, because the second clock signal CLK_2 is ready from the second time point t26, the multiplexer 123 may output the second clock signal CLK_2 having a second frequency f32 between the second time point t26 and the third time point t36 as the system clock signal CLK_SYS. The multiplexer 123 may output the first clock signal CLK_1 as the system clock signal CLK_SYS between the third time point t36 and the fourth time point t46 in which the droop of the supply voltage VSUP is not detected. Because the second clock signal CLK_2 is ready between the fourth time point t46 and the fifth time point t56 where the droop of the supply voltage VSUP is detected, the multiplexer 123 may output the second clock signal CLK_2 immediately as the system clock signal CLK_SYS. The multiplexer 123 may output the first clock signal CLK_1 as the system clock signal CLK_SYS after the fifth time point t56. Descriptions previously given with reference to FIG. 2 are omitted.

Figure 14:
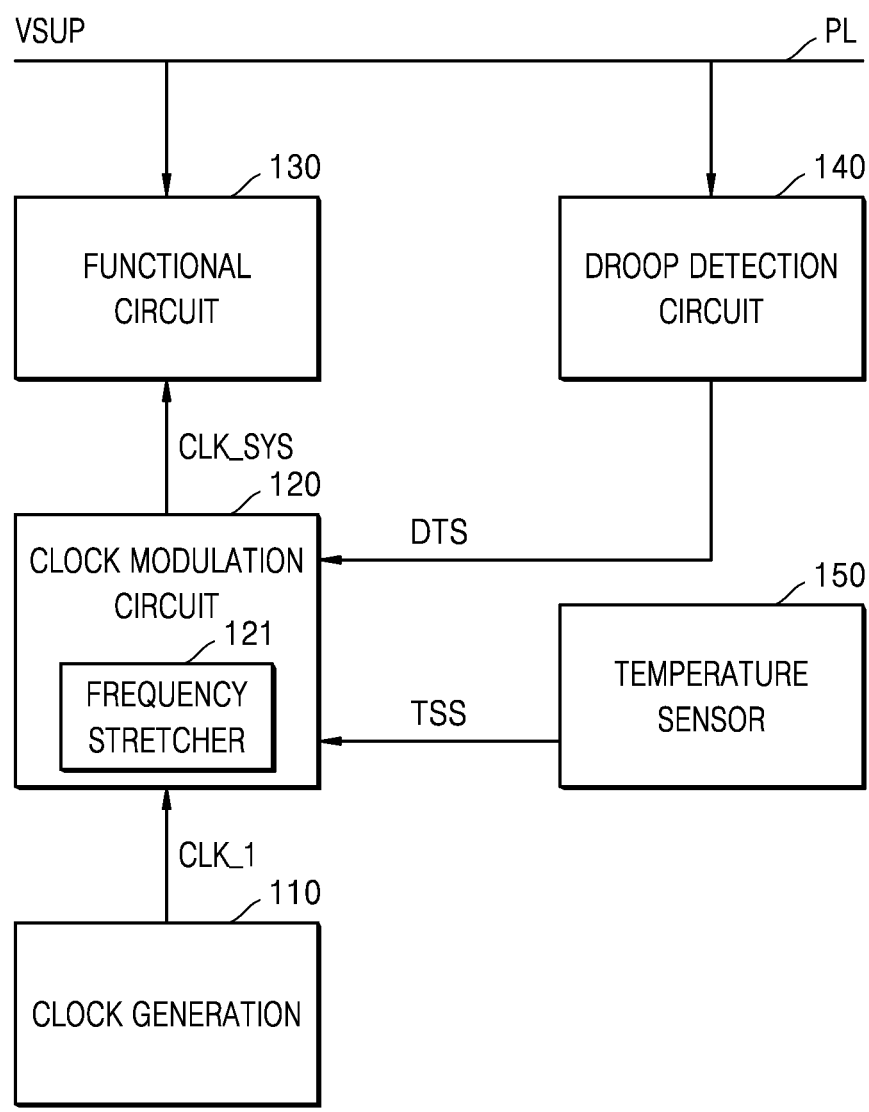
FIG. 14 is a block diagram of a system on chip according to an embodiment of the inventive concepts.

FIG. 14 is a block diagram of a system on chip 10b according to an embodiment of the inventive concepts.

Referring to FIG. 14, the system on-chip 10b may further include a temperature sensor 150, compared to the system on-chip 10a of FIG. 1. The temperature sensor 150 may measure the temperature inside the system on-chip 10b. The temperature sensor 150 may measure the temperature inside the system on-chip 10b. In some embodiments, the temperature sensor 150 may measure the temperature of the functional circuit 130. The temperature may be a parameter affecting the operation of the functional circuit 130, and when the temperature is excessively high, it may be difficult for the functional circuit 130 to smoothly perform a processing operation in synchronization with the functional circuit 130 of a high frequency. Accordingly, when the temperature is equal to or greater than the reference temperature, it may be necessary that the clock modulation circuit 120 lowers the frequency of the system clock signal CLK_SYS according to the embodiments as described above. The temperature sensor 150 may generate a temperature sensing signal TSS indicating a temperature state of the system on-chip 10b.

In an embodiment, the clock modulation circuit 120 may perform an operation of modulating the frequency of the system clock signal CLK_SYS low, based on the temperature sensing signal TSS and the detection signal DTS received from the temperature sensor 150.

However, the system on-chip 10b may further include at least one sensor for sensing parameters affecting the operation of the functional circuit 130, and the clock modulation circuit 120 may perform an operation of modulating the frequency of the system clock signal CLK_SYS low based on the sensing signal received from the at least one sensor.

Figure 15:
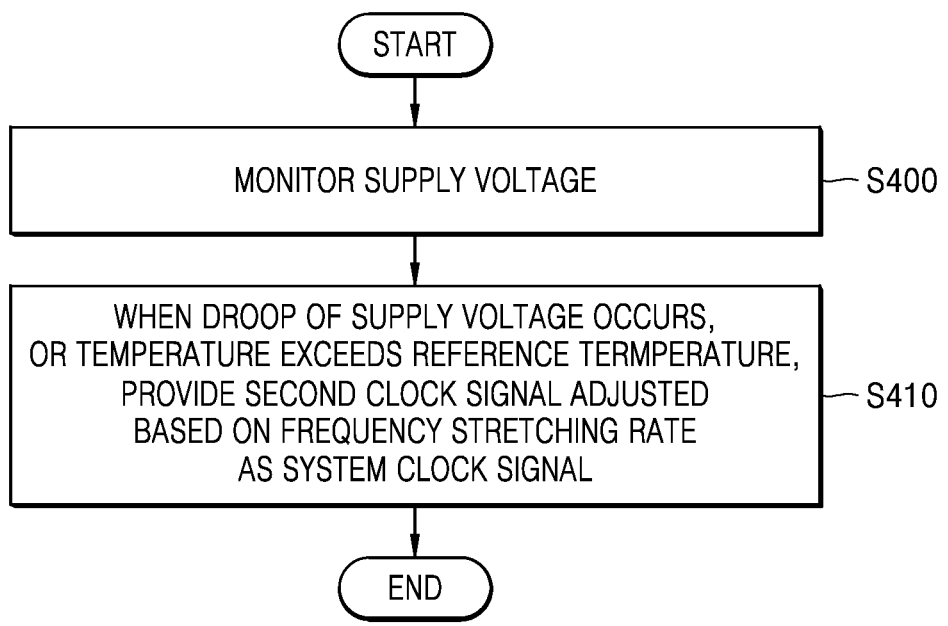
FIG. 15 is a flowchart describing an operation method of a system on chip, according to an embodiment of the inventive concepts.

FIG. 15 is a flowchart describing an operation method of a system on chip, according to an embodiment of the inventive concepts. Hereinafter, FIG. 14 is further referred to for better understanding.

Referring to FIGS. 14 and 15, the droop detection circuit 140 may monitor the supply voltage VSUP provided to the functional circuit 130 (S400). When the droop occurs in the supply voltage VSUP, or the temperature exceeds the reference temperature, the clock modulation circuit 120 may provide the second clock signal that has an adjusted frequency based on the frequency stretching rate to the functional circuit 130 as the system clock signal CLK_SYS (S410).

Figure 16:
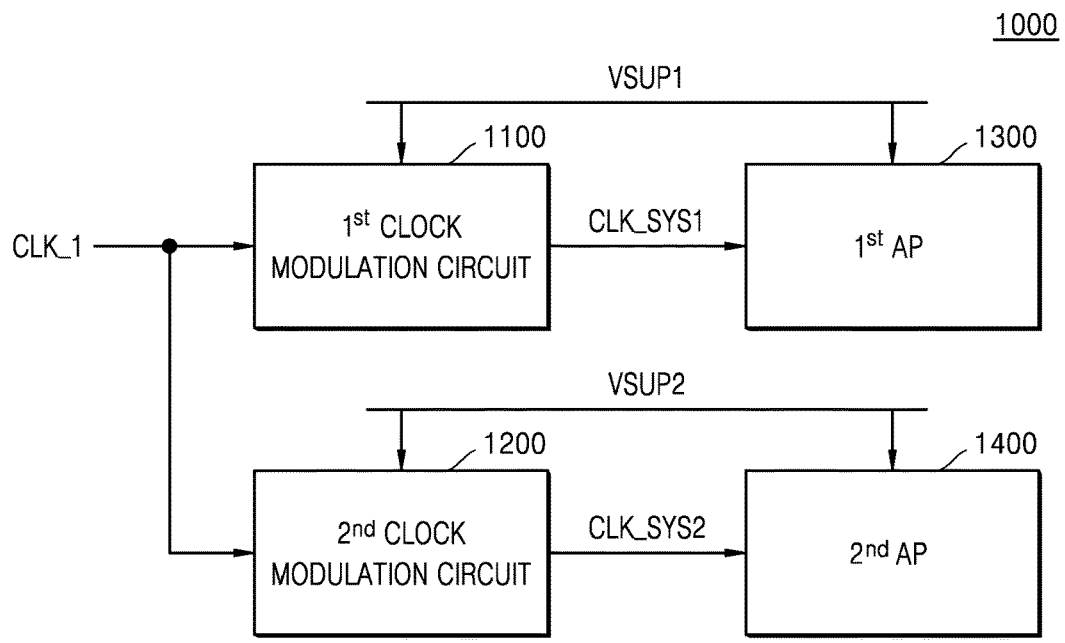
FIG. 16 is a diagram of a system on chip to which embodiments of the inventive concepts are applied.

FIG. 16 is a diagram of a system on chip 1000 to which embodiments of the inventive concepts are applied.

Referring to FIG. 16, the system on chip 1000 may include first and second clock modulation circuits 1100 and 1200, and first and second functional circuits 1300 and 1400. The first functional circuit 1300 may perform a first processing operation by receiving a first supply voltage VSUP1, and the second functional circuit 1400 may perform a second processing operation by receiving a second supply voltage VSUP2. The first and second processing operations may be the same as, or different from, each other.

The first clock modulation circuit 1100 may provide the first functional circuit 1300 with a first system clock signal CLK_SYS1 having a first target frequency less than the frequency of the first clock signal CLK_1 based on whether the droop of the first supply voltage VSUP1 occurs.

The second clock modulation circuit 1200 may provide the second functional circuit 1400 with a second system clock signal CLK_SYS2 having a second target frequency less than the frequency of the first clock signal CLK_1 based on whether the droop of the second supply voltage VSUP2 occurs.

The embodiments of the inventive concepts described above with reference to FIG. 1 or the like may be applied to each of the first and second clock modulation circuits 1100 and 1200.

In an embodiment, the first and second clock modulation circuits 1100 and 1200 may mutually and independently generate and provide to the first and second functional circuits 1300 and 1400 the first and second system clock signals CLK_SYS1 and CLK_SYS2, respectively.

In an embodiment, when a droop degree of the first supply voltage VSUP1 is different from a droop degree of the second supply voltage VSUP2, the first target frequency of the first system clock signal CLK_SYS1 may be different from the second target frequency of the second system clock signal CLK_SYS2. In addition, when the first processing operation is different from the second processing operation, that is, when a type of the first functional circuit 1300 is different from a type of the second functional circuit 1400, the first target frequency of the first system clock signal CLK_SYS1 may be different from the second target frequency of the second system clock signal CLK_SYS2.

In an embodiment, when the droop of the first supply voltage VSUP1 occurs, the first clock modulation circuit 1100 may provide the first functional circuit 1300 with the first system clock signal CLK_SYS1 having the first target frequency that is changed step by step, and when the droop of the second supply voltage VSUP2 occurs, the second clock modulation circuit 1200 may provide the second functional circuit 1400 with the second system clock signal CLK_SYS2 having the second target frequency that is changed step by step.

Figure 17:
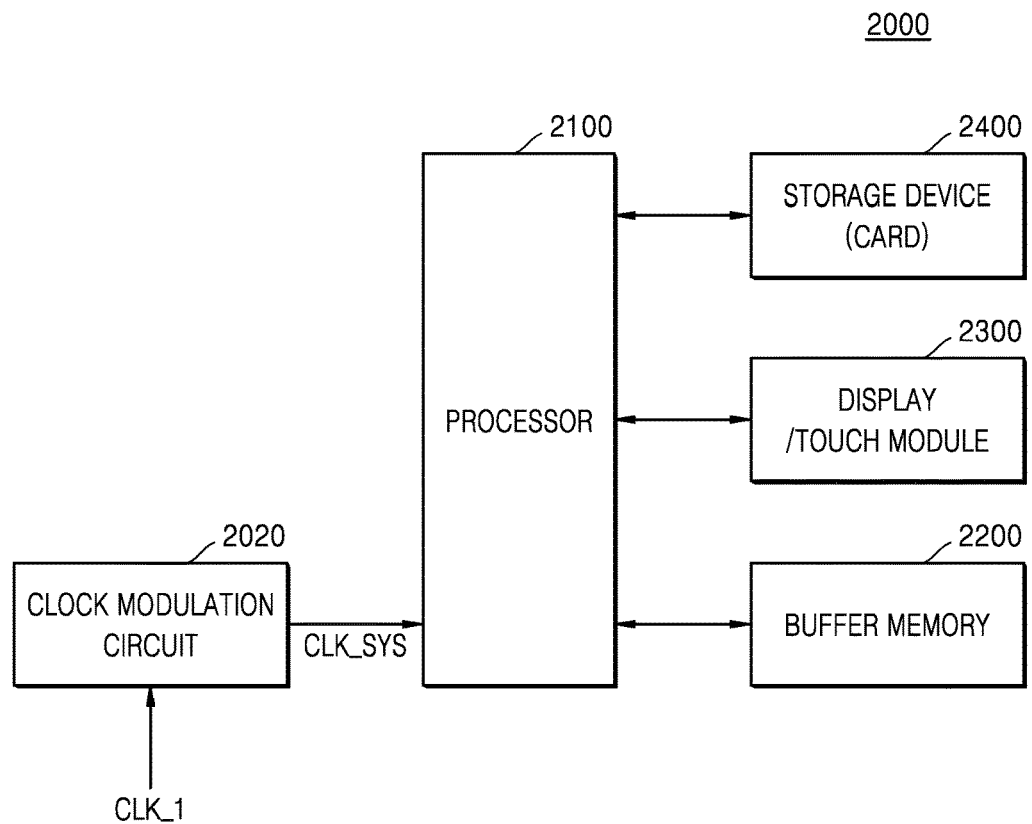
FIG. 17 is a block diagram of a mobile system including a clock generator, according to an embodiment of the inventive concepts.

FIG. 17 is a block diagram of a mobile system 2000 including a clock generator 2020, according to an embodiment of the inventive concepts.

Referring to FIG. 17, the mobile system 2000 may include the clock generator 2020, a processor 2100, a buffer memory 2200, a display/touch module 2300, and a storage device 2400. The processor 2100 and the clock generator 2020 may be implemented in a system on chip. When the droop of the supply voltage VSUP provided to the processor 2100 is detected, the clock generator 2020 may modulate a frequency of a system clock signal to be low in a digital domain based on the time-to-digital conversion method, and may provide the modulated system clock signal to the processor 2100. Although not illustrated, the mobile system 2000 may further include a security chip. The security chip may be implemented to provide all security functions. The security chip (not illustrated) may be configured with software and/or tamper resistant hardware, may permit security of a high standard, and may work together with a trusted execution environment (TEE) of the processor 2100. The security chip may include a native operating system (OS) that is an operating system, a security storing place that is an internal data storage, an access control block for controlling an access to the security chip, ownership management, key management, digital signature, a security function block for coding/decoding, or the like, and a firmware update block for updating the firmware of the security chip. The security chip may include, for example, a universal integrated circuit (IC) card (UICC) such as a universal subscriber identity module (SIM) (USIM), a code-division multiple access (CDMA) SIM (CSIM), and an internet protocol (IP) multimedia SIM (ISIM), a SIM card, an embedded secure element (eSE), a microSD, a sticker, etc.

The processor 2100 may be implemented to control all operations of the mobile system 2000 and wired/wireless communication with the outside. For example, the processor 2100 may include an application processor (AP), a combined modem AP (ModAP), etc. The buffer memory 2200 may be implemented to temporarily store necessary data during a processing operation of the mobile system 2000.

The display/touch module 2300 may be implemented to display data processed by the processor 2100, or receive data from a touch panel. The storage device 2400 may be implemented to store data of a user. The storage device 2400 may include an embedded multimedia card (eMMC), a solid state drive (SSD), a universal flash storage (UFS), etc. The storage device 2400 may include at least one non-volatile memory device.

A non-volatile memory device may include a NAND flash memory, a vertical NAND (VNAND) flash memory, a NOR flash memory, resistive random-access memory (RAM) (RRAM), phase-change RAM (PRAM), magnetoresistive RAM (MRAM), ferroelectric RAM (FRAM), spin transfer torque RAM (STT-RAM), etc.

While the inventive concepts have been particularly shown and described with reference to embodiments thereof, it will be understood that various changes in form and details may be made therein without departing from the spirit and scope of the following claims.

What is claimed is:
1. A system on chip comprising:
a functional circuit configured to perform a processing operation by receiving a supply voltage;
a droop detection circuit configured to monitor the supply voltage and generate a detection signal indicating whether a droop of the supply voltage has occurred;
a clock generation circuit configured to output a first clock signal having a first frequency; and
a clock modulation circuit configured to receive the detection signal and the first clock signal, and provide a system clock signal to the functional circuit,
wherein the clock modulation circuit comprises:
a digital controlled oscillator configured to output a second clock signal in response to a digital control signal;
a time-to-digital converter configured to respectively convert the first and second clock signals to first and second digital signals;
a digital logic circuit configured to generate a target digital signal corresponding to a target frequency from the first digital signal, and output the digital control signal adjusted in a direction so that the second digital signal is identical to the target digital signal; and
a multiplexer configured to output the first clock signal or the second clock signal as the system clock signal based on the detection signal.

2. The system on chip of claim 1, wherein the multiplexer is further configured to output the second clock signal having the target frequency to the functional circuit in response to the detection signal indicating that the droop of the supply voltage has been detected.

3. The system on chip of claim 1, wherein the multiplexer is further configured to output the first clock signal to the functional circuit in response to the detection signal indicating that the droop of the supply voltage has not been detected or that a drooped supply voltage has been recovered.

4. The system on chip of claim 1, wherein the digital logic circuit is further configured to generate the target digital signal from the first digital signal based on a frequency stretching rate indicating a ratio of a frequency of the first clock signal over the target frequency.

5. The system on chip of claim 4, wherein the time-to-digital converter is further configured to be set with a resolution to match a minimum change unit of the frequency stretching rate.

6. The system on chip of claim 4, wherein the droop detection circuit is further configured to generate the detection signal further indicating a droop degree of the supply voltage by using a plurality of reference voltages, and
wherein the digital logic circuit is configured to set the frequency stretching rate according to the droop degree of the supply voltage.

7. The system on chip of claim 6, wherein the digital logic circuit is further configured to change the frequency stretching rate in response to a change in the detection signal corresponding to a recovery of the droop of the supply voltage.

8. The system on chip of claim 1, wherein the clock modulation circuit further comprises a frequency divider configured to output a third clock signal by dividing a frequency of the first clock signal,
wherein the digital logic circuit is further configured to generate a ready signal indicating whether the second clock signal is ready, and
wherein the multiplexer is further configured to output one of the first through third clock signals as the system clock signal based on the detection signal and the ready signal.

9. The system on chip of claim 8, wherein the multiplexer is further configured to output the third clock signal as the system clock signal in response to the droop of the supply voltage being detected and a ready signal indicating that the second clock signal is not ready.

10. The system on chip of claim 9, wherein the multiplexer is further configured to output the second clock signal as the system clock signal in response to the ready signal indicating that the second clock signal is ready while the third clock signal is being output as the system clock signal.

11. The system on chip of claim 1, further comprising a temperature sensor configured to sense a temperature inside the system on chip and generate a sensing signal indicating a temperature state, and
wherein the multiplexer is further configured to output the first clock signal or the second clock signal as the system clock signal based on the sensing signal.

12. The system on chip of claim 11, wherein the multiplexer is further configured to output the second clock signal as the system clock signal in response to the temperature inside the system on chip exceeding a reference temperature.

13. The system on chip of claim 1, wherein the digital logic circuit is further configured to adjust the digital control signal based on a binary search method by comparing the second digital signal to the target digital signal.

14. A clock generator configured to provide a system clock signal to a functional circuit, the clock generator comprising:
a clock generation circuit configured to generate a first clock signal having a first frequency; and
a clock modulation circuit configured to generate a second clock signal having a second frequency from the first clock signal,
wherein the second frequency of the second clock signal is less than the first frequency of the first clock signal, and
wherein the clock modulation circuit comprises:
a digital controlled oscillator configured to output the second clock signal in response to a digital control signal;
a time-to-digital converter configured to generate first and second digital signals respectively indicating the first and second frequencies of the first and second clock signals;
a digital logic circuit configured to generate a target digital signal corresponding to a target frequency from the first digital signal, and adjust the digital control signal based on a comparison of the second digital signal to the target digital signal; and
a multiplexer configured to output the first clock signal or the second clock signal as the system clock signal.

15. The clock generator of claim 14, wherein the target frequency is set by multiplying the first frequency of the first clock signal by a frequency stretching rate.

16. The clock generator of claim 15, wherein the frequency stretching rate is set according to a droop pattern of a supply voltage of the functional circuit.

17. The clock generator of claim 15, wherein the clock modulation circuit further comprises a frequency divider configured to divide the first frequency of the first clock signal, and output a third clock signal, and
wherein the multiplexer is further configured to output one of the first through third clock signals as the system clock signal.

18. A system on chip comprising:
a first functional circuit configured to perform a first processing operation by receiving a first supply voltage;
a second functional circuit configured to perform a second processing operation by receiving a second supply voltage;
a clock generation circuit configured to output a first clock signal having a first frequency;
a first clock modulation circuit configured to provide, to the first functional circuit, a second clock signal having a first target frequency less than the first frequency of the first clock signal based on an occurrence of a droop of the first supply voltage; and
a second clock modulation circuit configured to provide, to the second functional circuit, a third clock signal having a second target frequency less than the first frequency of the first clock signal based on an occurrence a droop of the second supply voltage,
wherein the first clock modulation circuit comprises a first voltage control oscillator configured to output the second clock signal in response to a first digital control signal, a first time-to-digital converter configured to respectively convert the first and second clock signals to first and second digital signals, and a first digital logic circuit configured to generate a first target digital signal corresponding to the first target frequency from the first digital signal, and adjust the first digital control signal by comparing the first target digital signal to the second digital signal, and wherein the second clock modulation circuit comprises a second voltage control oscillator configured to output the third clock signal in response to a second digital control signal, a second time-to-digital converter configured to respectively convert the first and third clock signals to third and fourth digital signals, and a second digital logic circuit configured to generate a second target digital signal corresponding to the second target frequency from the third digital signal, and adjust the second digital control signal by comparing the second target digital signal to the fourth digital signal.

19. The system on chip of claim 18, wherein the first target frequency is different from the second target frequency in response to a droop degree of the first supply voltage being different from a droop degree of the second supply voltage.

20. The system on chip of claim 18, wherein the first target frequency is different from the second target frequency in response to the first processing operation being different from the second processing operation.

* * * * *